(12) United States Patent
Bergeron

(10) Patent No.: US 7,377,153 B2
(45) Date of Patent: May 27, 2008

(54) DYNAMOMETER FRAME

(76) Inventor: Robert M. Bergeron, P.O. Box 785, Alton, NH (US) 03809

( * ) Notice: Subject to any disclaimer, the term of this patent is extended or adjusted under 35 U.S.C. 154(b) by 0 days.

(21) Appl. No.: 11/484,079

(22) Filed: Jul. 11, 2006

(65) Prior Publication Data

US 2008/0011072 A1    Jan. 17, 2008

(51) Int. Cl.
*G01M 17/00* (2006.01)
(52) U.S. Cl. ............................ 73/117; 73/123
(58) Field of Classification Search ............... 73/112, 73/116, 117, 117.2, 117.3, 118.1, 121, 123, 73/124, 125, 126
See application file for complete search history.

(56) References Cited

U.S. PATENT DOCUMENTS

| | | | | |
|---|---|---|---|---|
| 5,010,763 | A * | 4/1991 | Schneider | 73/117 |
| 5,136,878 | A * | 8/1992 | Wolcott | 73/117 |
| 5,277,060 | A * | 1/1994 | Lehman et al. | 73/117 |
| 5,311,770 | A * | 5/1994 | D'Angelo | 73/117 |
| 5,402,674 | A * | 4/1995 | Ganzhorn et al. | 73/117 |
| 5,445,013 | A * | 8/1995 | Clayton et al. | 73/117 |
| 5,452,605 | A * | 9/1995 | Wilson et al. | 73/117 |
| 5,522,257 | A * | 6/1996 | D'Angelo | 73/117 |
| 5,531,107 | A * | 7/1996 | Ganzhorn, Jr. | 73/117 |
| 5,756,889 | A * | 5/1998 | D'Angelo | 73/117 |
| 5,844,145 | A * | 12/1998 | D'Angelo | 73/862.18 |
| 5,973,274 | A * | 10/1999 | Zarchy | 177/132 |
| 6,247,357 | B1 * | 6/2001 | Clayton et al. | 73/117 |

* cited by examiner

*Primary Examiner*—Eric S McCall
(74) *Attorney, Agent, or Firm*—Davis Bujold & Daniels, P.L.L.C.

(57) ABSTRACT

A roller support assembly for a dynamometer system includes a plurality of bearing support structures wherein each bearing support structure includes at least one roller bearing, at least one vertical support assembly for supporting the at least one roller bearing in a vertical plane, at least one horizontal support assembly for supporting the at least one roller bearing in a horizontal plane, and an installation site structure supporting each of the plurality of bearing support structures. Each of the at least two bearing support structures further includes at least one vertical support assembly for supporting the at least one roller bearing in a vertical plane and each of the at least two bearing support structures further includes a pair of vertical support assembly for supporting the at least one roller bearing in a vertical plane.

1 Claim, 9 Drawing Sheets

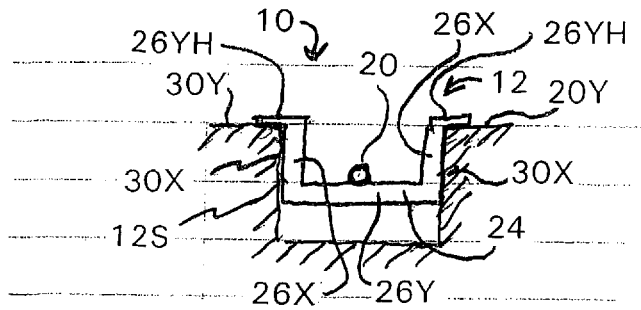
Fig. 2E
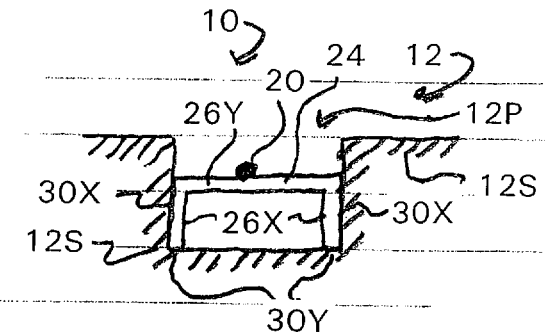
Fig. 2F
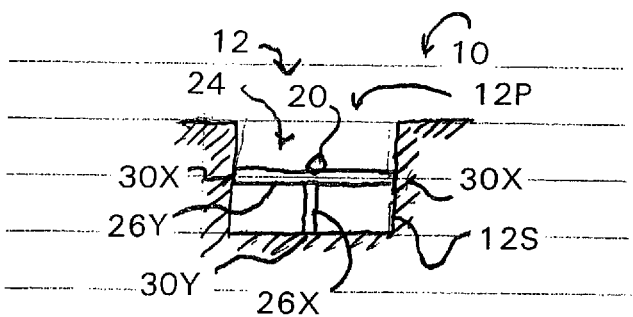
Fig. 2G
Fig. 2H
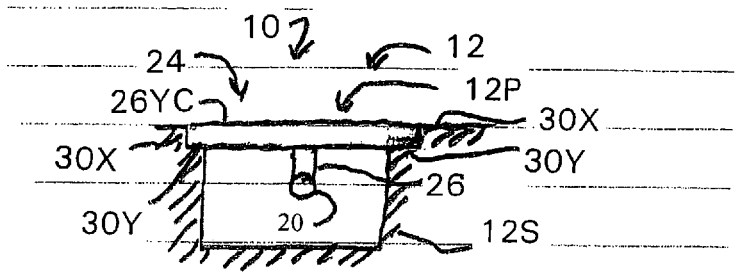

DYNAMOMETER FRAME

FIELD OF THE INVENTION

The present invention relates to dynamometers for powered vehicles and, more specifically, to dynamometer improvements concerning the frame for supporting the roller of a dynamometer system.

BACKGROUND OF THE INVENTION

Dynamometer systems of various types are used to determine statically the performance characteristics of motors and engines of various types and of vehicles powered by such motors and engines. In general, dynamometer systems for vehicles include some form of test stand structure, such as an inertial roller, that rotatingly supports the vehicle's drive wheel(s). During operation, the dynamometer system allows the vehicle to remain in a stationary fixed position while engine or motor drives the vehicle's wheel(s) which, in turn, drives the inertial roller.

A dynamometer system typically includes various devices for physically imposing loads on the vehicle wheel or wheels as it or they rotate, and devices for measuring, for example, the torque imposed on the wheel(s) or the simulated speed or acceleration of the vehicle by measuring revolutions per minute (rpm) of the wheel(s) versus time and for calculating other performance factors of interest such as, for example, horsepower, engine torque, velocity, distance traveled, etc.

It is apparent that the inertial roller is a critical element of the dynamometer system as the inertial roller(s) supports the weight of the vehicle and absorbs the driving forces imposed by the vehicle on the wheel(s), couples the driving forces imposed on the vehicle wheels to the measurement devices and couples loads imposed by the system to the driving wheels. The inertial roller assembly must, therefore, allow the roller to rotate freely and precisely while supporting very large static and dynamic loads.

There are commonly three basic configurations of test stands and inertial rollers, namely, in-ground configuration, a below ground configuration and a mobile configuration. In-ground configurations comprise an installation where the test stand is generally at ground level and the roller assembly is located below ground level in, for example, a pit. Above ground configurations comprise an installation where the test stand and roller assembly are raised above ground level. Mobile configurations, in turn, are similar to above-ground installations, but the test stand and roller assembly are mounted on or in to some form of trailer or some other mobile vehicle. The roller assemblies, however, customarily follow a common design regardless of whether the installation is in-ground, above-ground or mobile.

As illustrated in FIGS. 1A-1H, a typical inertial roller assembly is a stand-alone structure which comprises load bearing and support/reinforcement beams that, at a minimum, enclose the roller and the support bearings which facilitate rotation of the roller axle. In most instances, the roller assembly further supports and includes, for example, the inertial roller, a torque transducer, such as a strain gauge device for measuring a driving torque imposed on the roller by the driven wheels of the vehicle, a speed sensor for measuring a rotational speed of the roller and a torque load device such as an eddy current brake or a water brake for imposing a torque load on the roller.

As is apparent from FIGS. 1A-1H, the typical inertial roller assembly structure is completely self-contained and is essentially independent of the nature of the installation in which it is used. That is, the same inertial roller assembly structure can be used in an above-ground installation, where the assembly will merely stand upon the floor and will be surrounded by a platform upon which the vehicle will be supported or in an in-ground installation where the assembly will be mounted within a pit and the vehicle will be supported by the surrounding ground or floor. A mobile installation will be similar to an above-ground installation except that the inertial roller assembly structure will either be mounted into an opening or space formed in the trailer structure or will be incorporate into the trailer structure.

It is apparent that the methods of the prior art are advantageous in that the same roller assembly structure can be used for either an in-ground, an above-ground or a mobile installation thus and requires only a suitable space to receive the roller assembly structure, such as a pit for an in-ground installation, a "pit" or an "opening" in a trailer structure or merely a suitable floor space in an above-ground installation. However, due to the numerous components forming the framework for the roller assembly structure, conventional roller assembly structures, according to the prior art, are generally relatively complex and consequently expensive to manufacture and/or construct. That is, the prior art roller assembly structures require many components or elements, many structural stock cuts and many welds in order to produce a structure capable of meeting all possible requirements for the roller assembly structure.

Three of the primary structural requirements of a roller assembly structure are to securely support the roller and thus the driven wheel or wheels of the vehicle at a fixed height against the weight of the vehicle, to securely support the roller against horizontal motion along the axis of thrust of the driven wheel or wheels, that is, along the fore/aft axis relative to the nominal direction of motion of the vehicle, and to support the roller against torsional forces imposed by the driven wheel or wheels. At least the second and the third of these structural requirements, that is, that the roller assembly structure support the roller against horizontal and torsional forces, typically require not only that the roller assembly structure itself be constructed to resist these forces, but also that the roller assembly structure be connected to or braced by the installation site, such as by being bolted to the floor.

As shown in FIGS. 1A and 1B, the roller assembly framework for a prior manufactured by Land & Sea, Inc. of North Salem, N.H. generally comprises a box like structure 100 having four corner vertical supports 102 and upper and lower horizontal longitudinal supports 104, 106 which interconnect each pair of the corner vertical supports 102 with one another. A plurality of spaced apart diagonal and vertical supports 108 and 110 interconnect and reinforce the upper and the lower horizontal longitudinal supports 104, 106 with one another. In addition, this prior art roller assembly framework includes two lower horizontal transverse supports 112 which interconnect two adjacent corner vertical supports with one another and also provide support of a bearing. A couple of horizontal and vertical supports 114, 116 are connected to the lower horizontal transverse support 112 and reinforce the same. A floor mounting pad 118 is located at the bottom of each one of the four corner vertical supports 102 for securing the roller assembly structure to the floor. As shown in FIG. 1A, a bearing 120 supports each opposed end of an axle to facilitate rotation of the roller 114.

FIGS. 1C-1H show a variety of other known roller assembly structures which, as can be seen in the drawings, are all quite complex to manufacture and assemble.

Wherefore, it is an object of the present invention to overcome the above mentioned shortcomings and drawbacks associated with the prior art roller assembly structures.

SUMMARY OF THE INVENTION

The present invention is directed to a roller support assembly for a dynamometer system. According to the present invention, a roller support assembly includes a plurality of bearing support structures wherein each bearing support structure includes at least one roller bearing, at least one vertical support assembly for supporting the at least one roller bearing in a vertical plane, at least one horizontal support assembly for supporting the at least one roller bearing in a horizontal plane, and an installation site structure supporting each of the plurality of bearing support structures.

Each of the at least two bearing support structures further includes at least one vertical support assembly for supporting the at least one roller bearing in a vertical plane and each of the at least two bearing support structures further includes a pair of vertical support assembly for supporting the at least one roller bearing in a vertical plane.

In an exemplary embodiment, a roller support assembly for a dynamometer system includes two bearing support structures wherein each bearing support structure consists of a horizontal support assembly and a vertical support assembly permanently connected to and extending substantially normal from each opposed end of the horizontal support assembly wherein each horizontal support assembly supports a roller bearing. Opposed ends of each of the vertical support assemblies have a horizontal extension for engaging with a horizontal surface of a top edge of a pit and the vertical support assemblies engage with vertical sides of the pit with each horizontal extension having at least one bore hole therein to facilitate permanently fastening the bearing support structure to the pit.

BRIEF DESCRIPTION OF THE DRAWINGS

The invention will now be described, by way of example, with reference to the accompanying drawings in which:

FIGS. 2A-2M are diagrammatic illustrations of inertial roller assemblies according to the present invention.

DETAILED DESCRIPTION OF THE INVENTION

As illustrated in FIGS. 2A-2L, a roller assembly structure 10, according to the present invention, is designed and adapted to utilize the physical and mechanical characteristics of the specific installation in which the roller assembly structure 10 is to be employed, thereby allowing the roller assembly structure 10 to be significantly simplified structure with corresponding reductions in the complexity and associated manufacturing and assembling costs for the roller assembly 10.

Figure 1A:
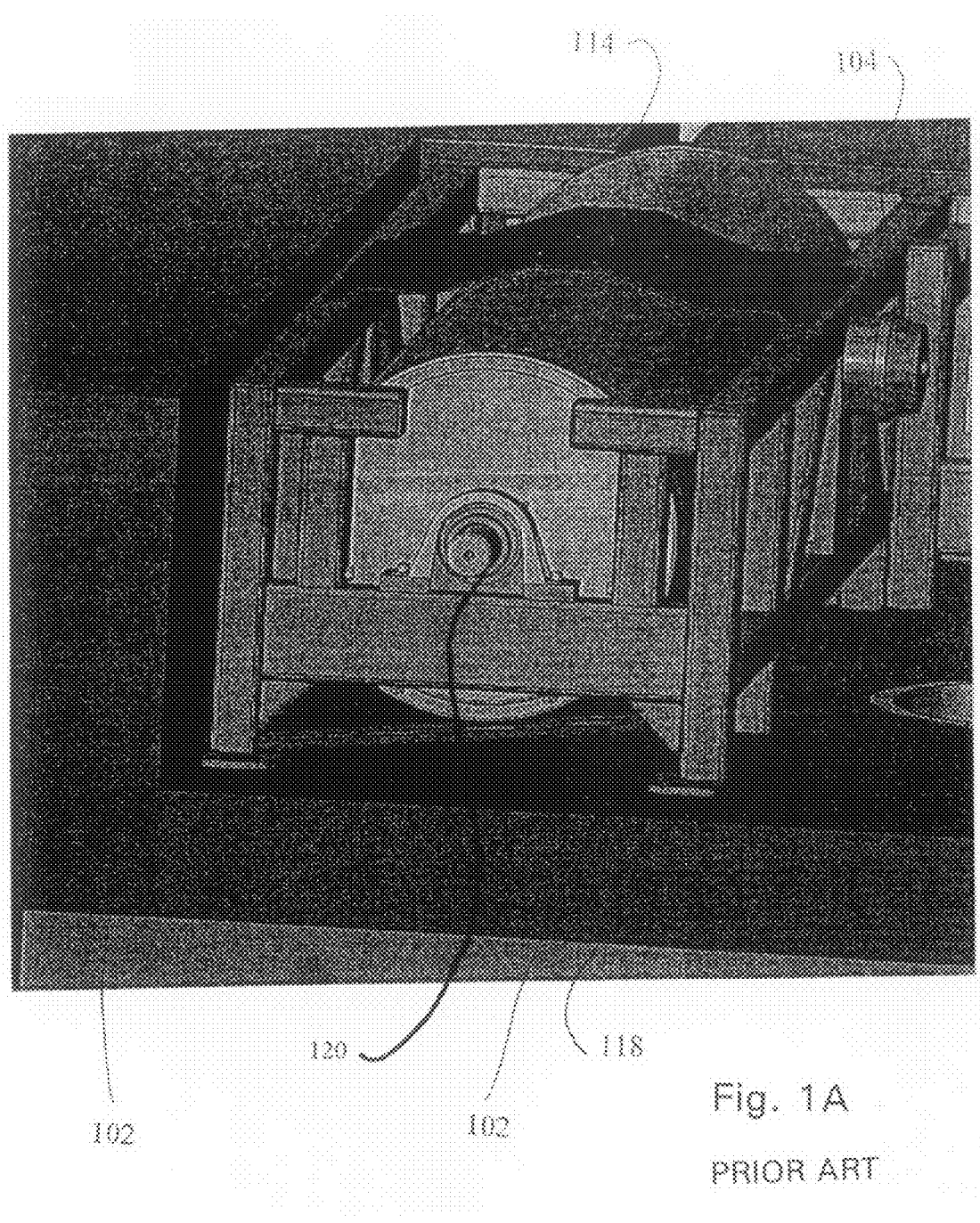
FIGS. 1A-1H are diagrammatic illustrations of prior art inertial roller assemblies and inertial roller assembly structures.
Figure 1B:
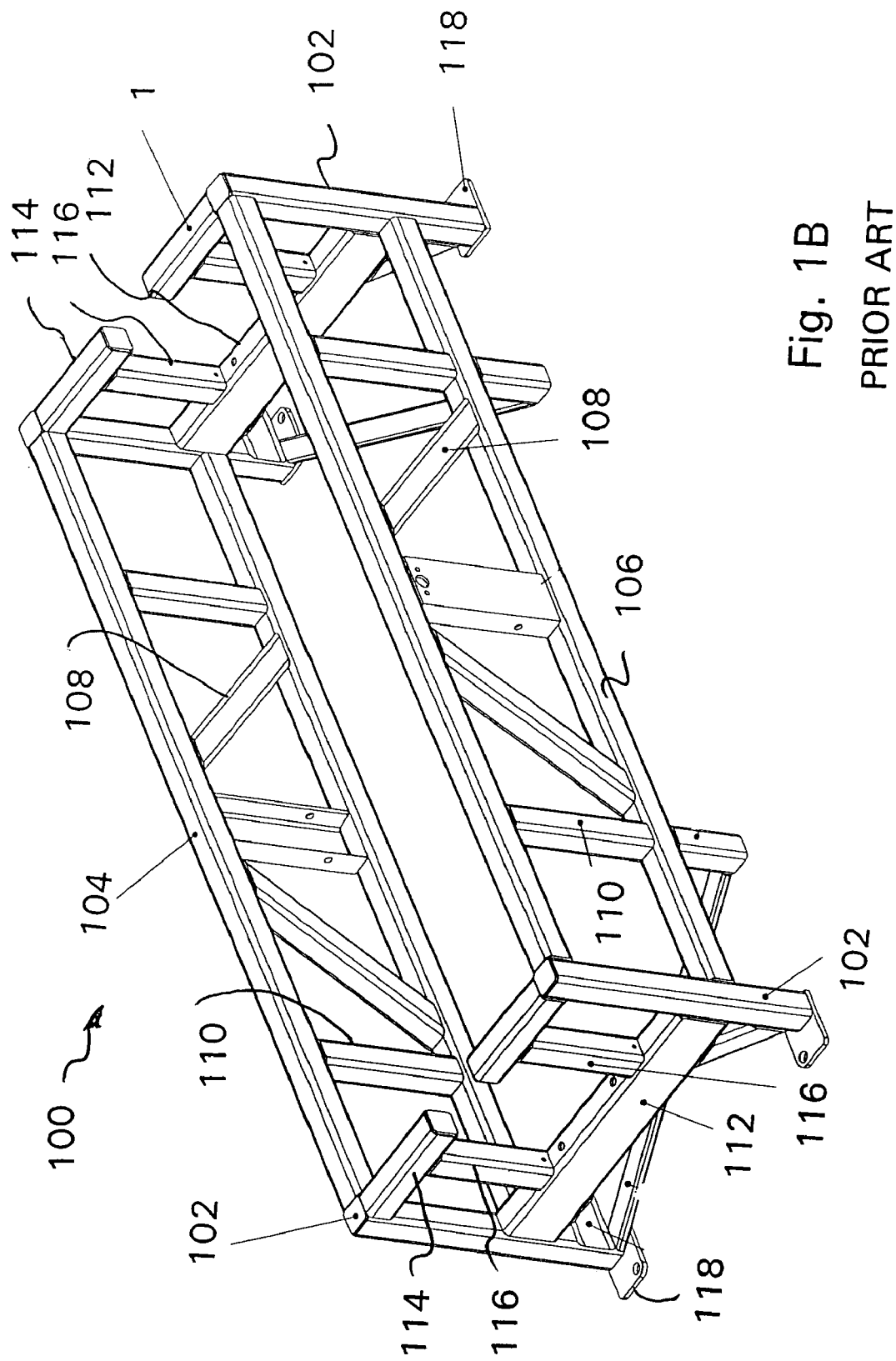
Figure 1C:
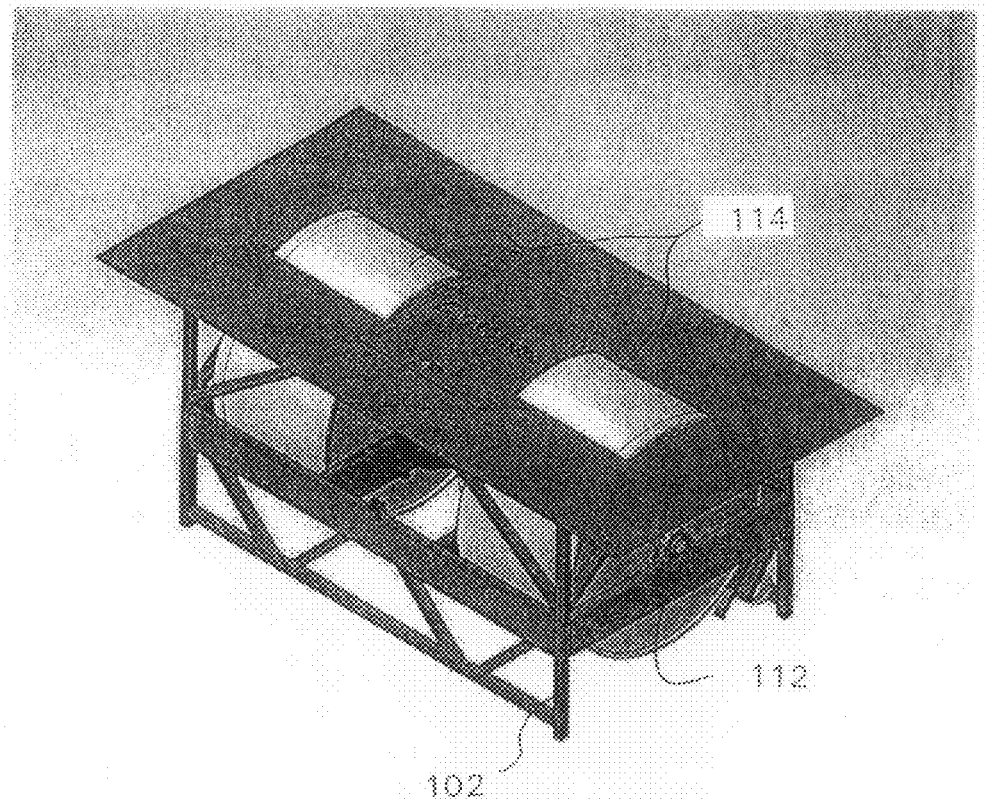
Figure 1G:
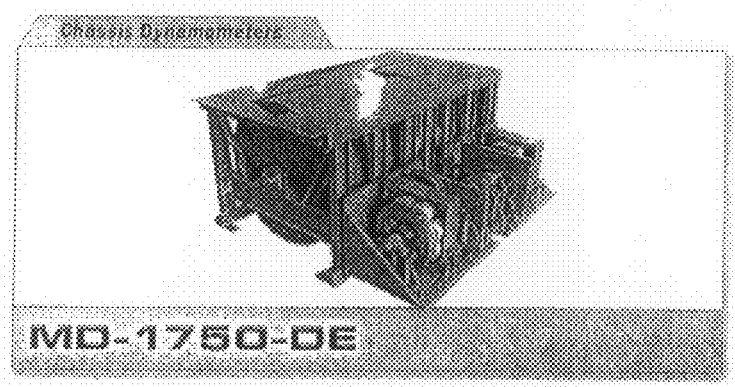
Figure 1D:
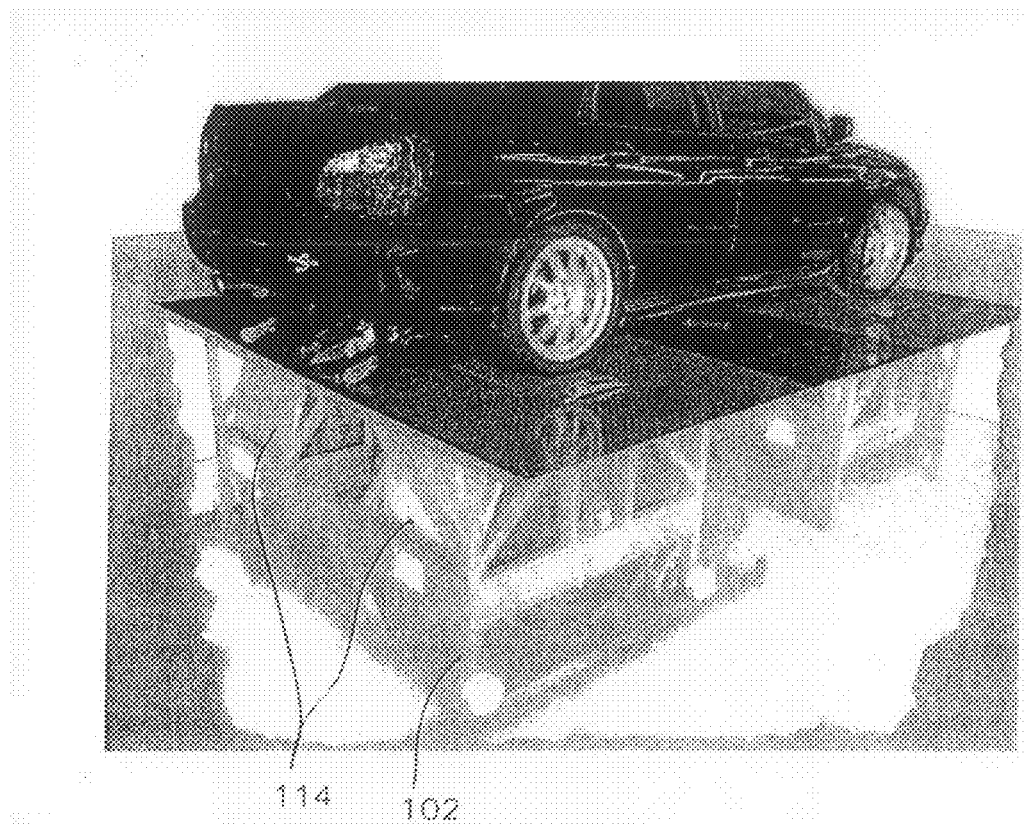
Figure 1E:
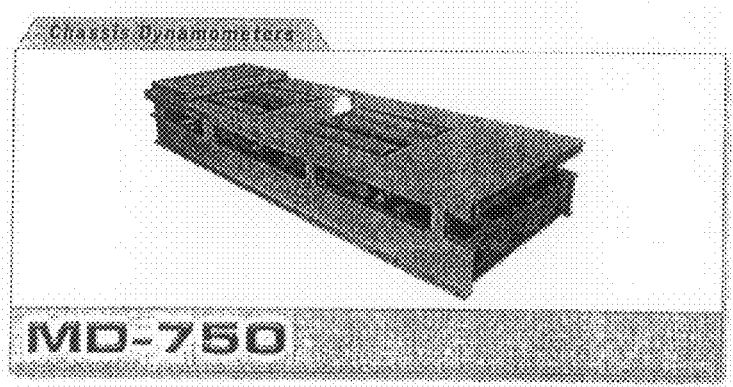
Figure 1H:
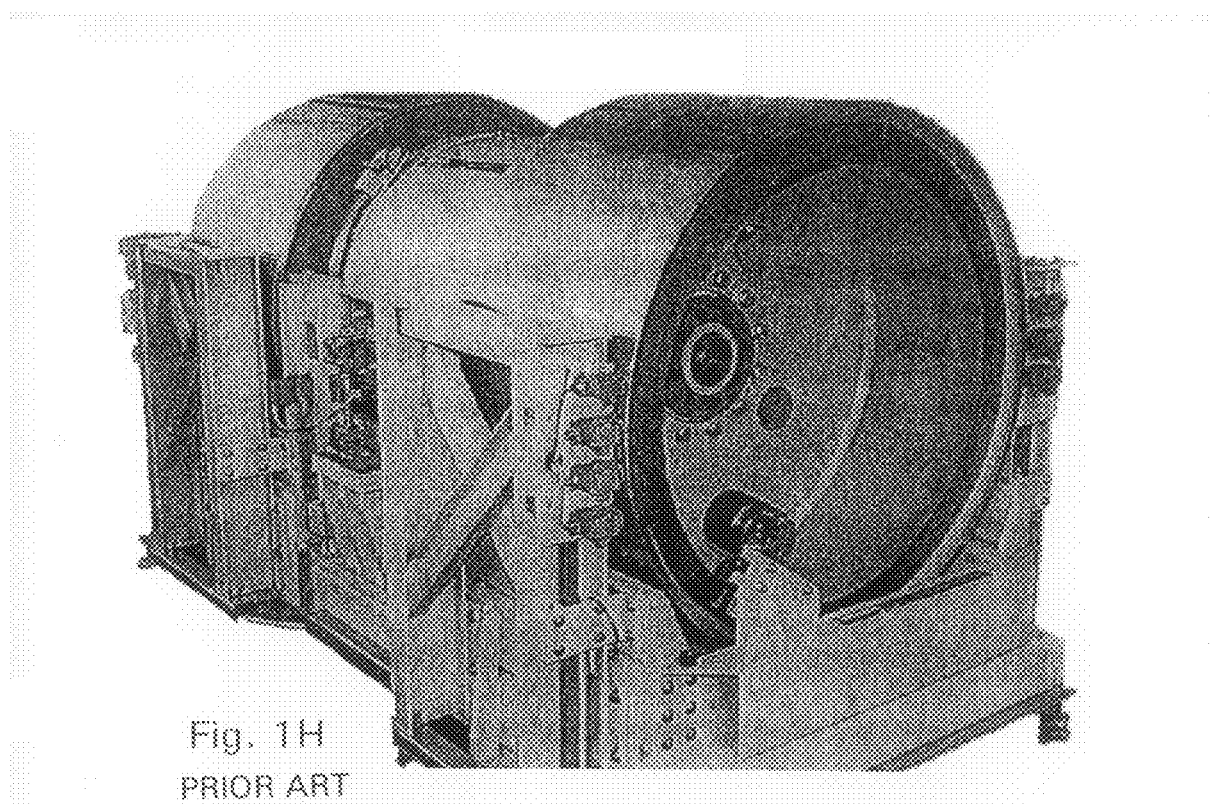
Figure 1F:
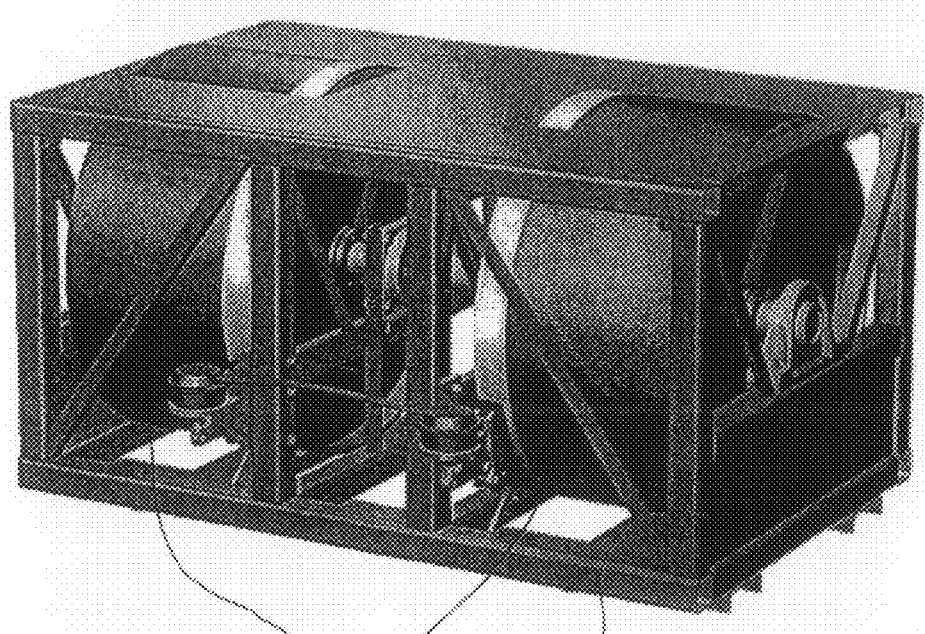
Figure 2A:
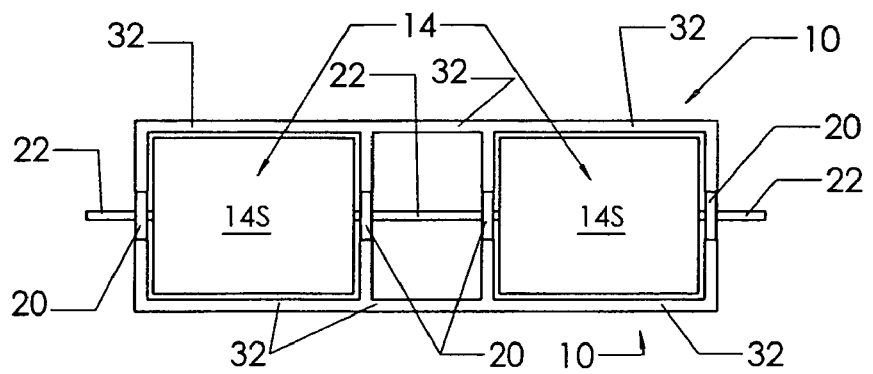
Figure 2B:
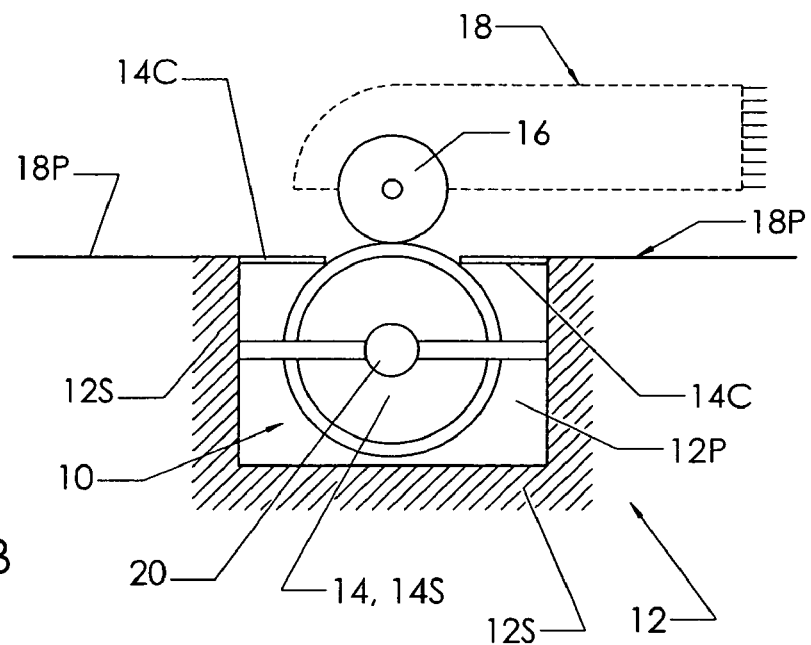

According to the present invention as illustrated in FIGS. 2A and 2B, the primary structural requirements of the roller assembly structure 10 are (1) to securely support a roller 14, and thus a driven wheel or wheels 16 of a vehicle 18, at a fixed height against the weight of the vehicle 18, (2) to securely support the roller 14 against horizontal motion along the axis of thrust of the driven wheel or wheels 16, that is, along the fore/aft axis relative to the nominal direction of motion of the vehicle 18, and (3) to support the roller 14 against torsional forces imposed by the driven wheel or wheels 16. As discussed above, the requirements that the roller assembly structure support the roller against horizontal and torsional forces require that the roller assembly structure itself be constructed to resist these forces and that the roller assembly structure resist horizontal and rotational movement relative to a surrounding installation site 12. According to the present invention, these requirements can be met in the installation site 12, for example, by incorporating the structure of the installation site 12 as a portion of or into the roller assembly structure 10.

As illustrated in FIGS. 2A and 2B, the vehicle 18 is supported on a vehicle platform 18P that may comprise, for example, a floor or other ground level surface, a raised platform or a trailer frame, and the roller assembly structure 10 is accommodated in an opening or a recessed pit 12P formed in the floor, the raised platform or the trailer frame. The roller 14 is mounted into the assembly structure 10 by at least two roller bearings 20, which are located, for example, at both opposed ends of an axle 22 of roller 14. It will be recognized there may be intermediate roller bearings 20 located along the length of axle 22, depending on the specific configurations of the roller 14 and/or the axle 22 to provide additional support for the roller 14. For example, roller 14 may comprise two separate portions or segments 14S, each being positioned for supporting one of a pair of driven wheels 16, with the roller bearing 20 located at each end of axle 22 and at least one addition roller bearing 20 located in the space between two separate portions or segments 14S. As indicated, the upper curvature of roller 14 or upper curvatures of roller segments 14S generally slightly extend above the level of platform 18P, e.g., by a few inches or so, so that vehicle 18 can be readily positioned with its wheel or wheels 16 resting solely on the roller 14 or roller segments 14S. For safety reasons, those portions of the pit 12P opening in the platform 18P that are not occupied by the upper curvature of the roller 14 or roller segments 14S are usually covered by one or more cover plates 14C in order to prevent personnel from accidentally falling into the pit 12P.

Figure 2M:
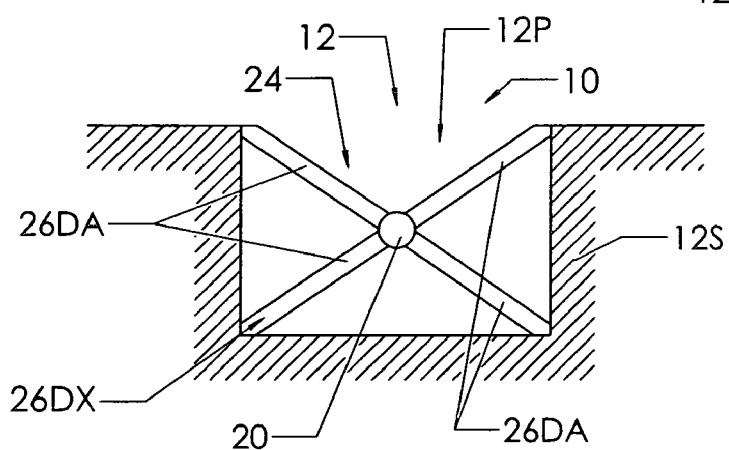
Figure 2C:
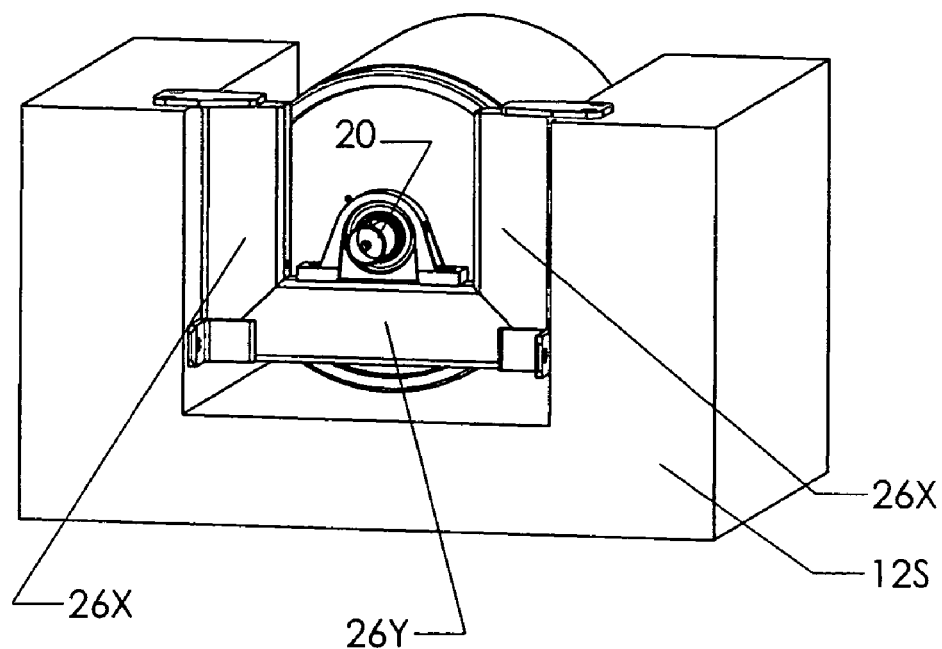
Figure 2D:
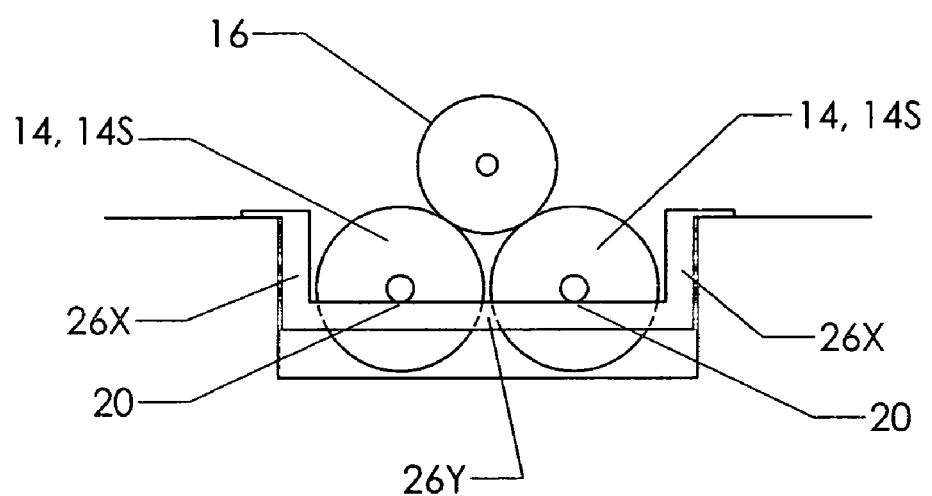
Figure 2I:
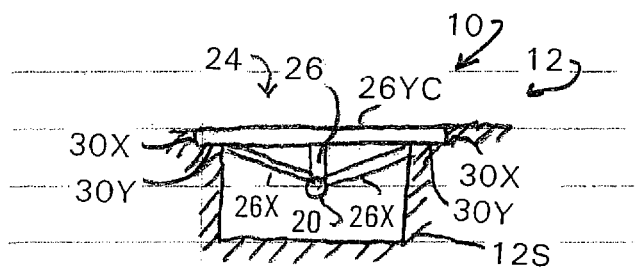

According to the present invention and as illustrated in general diagrammatic form in FIG. 2C, the roller assembly structure 10 includes at least two bearing support structures 24 in which each bearing support structure 24 supports a corresponding roller bearing 20. Each bearing support structure 24, in turn, includes at least one vertical support assembly 26X (two vertical support assemblies 26X are shown in this Figure) that directly or indirectly supports the bearing support structure 24 in the vertical plane and at least one horizontal support assembly 26Y that directly or indirectly supports the bearing support structure 24 in the horizontal plane. Vertical support assemblies 26X and horizontal support assemblies 26Y, in turn, engage with and are supported in their respectively planes by vertical planes 30X and horizontal planes 30Y of the surrounding installation site 12S, thereby incorporating structural features 12S of the installation site 12 into the roller assembly structure 10 in replacement for certain of the structural members of the roller assembly structures of the prior art. In the instance of an in-ground installation site 12, the installation site structure 12S will typically include, for example, the concrete walls and a floor forming or defining the pit 12P and, in the instance of an above-ground or mobile installation site 12, the installation site structure 12S will typically include the framework of the above ground platform structure or the trailer frame or chassis surrounding or circumscribing the pit 12P.

Further exemplary embodiments of the roller assembly structures 10, according to the present invention, are illustrated in FIGS. 2D-2L FIG. 2D, for example, is a diagrammatic illustration of an embodiment wherein the roller 14 or roller segments 14S are doubled, that is, that there may be rollers 14 or roller segments 14S arrange in fore/aft tandem. In such embodiments, the support members described below will support a pair of rollers axles rather than the single axle arrangement shown for purposes of illustration, but the adaptation will be apparent to those of ordinary skill in the arts after the following descriptions of single axle embodiments.

In FIG. 2E for example, each bearing support structure 24 (only one of which is shown in this FIG. and the oppose end is similarly supported) includes the single straight or arched horizontal support assembly 26Y that supports the corresponding roller bearing 20 at its mid-point and extends between and abuts against the fore and aft ends of vertical planes 30X forming the vertical walls of the pit 12P of an in-ground installation 12. Horizontal support assembly 26Y thereby supports the bearing 20 against fore and aft forces and movement and fixes the horizontal location of the bearing 20. Each opposed end of horizontal support assembly 26Y is, in turn, connected to and supported by a vertical support assembly 26X that extends upwards to the top of the pit 12P and that includes a horizontal extensions 26YH that engages with and rests upon the horizontal planes 20Y and 30Y forming the top edge of the pit 12P. Each vertical support assembly 26X thereby supports one end of the horizontal support assembly 26Y, and thus the bearing 20, and supports the bearing 20 against vertical forces and fixes the vertical position of the bearing 20. One or more bore holes may be drilled into the horizontal support assembly 26Y to facilitate permanently fastening the bearing support structure 24 to the top of the pit 12P. In this embodiment, therefore, each bearing support element, for supporting the bearing 20, comprises five elements, that is, the single horizontal support assembly 26Y, two vertical support assemblies 26X and two horizontal extensions 26YH.

In a yet further exemplary embodiment, as illustrated in FIG. 2F, the bearing support structure 24 illustrated of FIG. 2E is inverted so that vertical support assemblies 26X extend downward from the straight or arched horizontal support assembly 26Y with the ends of vertical support assemblies 26X being supported by the horizontal plane 30Y forming the base or bottom of the pit 12P. Further, one or more bore holes may be drilled into each of the vertical support assemblies 26X to facilitate permanently fastening the bearing support structure 24 to the base or bottom of the pit 12P. This implementation thereby reduces the bearing support structure 24 to three elements, that is, the single horizontal support assembly 26Y and two vertical support assemblies 26X. Alternatively, the horizontal support assembly 26Y may be secured to each end of the vertical support assemblies 26X and one or more bore holes may be drilled into each of the horizontal support assemblies 26Y to facilitate permanently fastening the bearing support structure 24 to the base or bottom of the pit 12P.

In the embodiment illustrated in FIG. 2G, the single straight or arched horizontal support assembly 26Y again supports the corresponding roller bearing 20 substantially at its mid-point and extends between the vertical planes 30X forming the vertical walls of the pit 12P of an in-ground installation 12. The opposed ends of horizontal support assembly 26Y may either abut against the vertical planes 30X forming the vertical walls of the pit 12P of an in-ground installation 12 or may engage into vertical apertures or slots 12S of pit 12P with the ends of horizontal support element 26Y abutting against vertical surface 30X forming a rear wall of the aperture or slot 12S and the lower side of the ends of horizontal support element 26Y resting on the horizontal surface 30Y forming the bottom surface of each aperture or slot 12S. In this embodiment, however, there is the single vertical support assembly 26X that extends downwards from the midpoint of horizontal support assembly, that is, from the region supporting the roller bearing 20, with the lower end of vertical support assembly 26X abutting against the horizontal surface 30Y forming the base or the floor of pit 12P. To secure each bearing support structure 24 in position, one or more bore holes may be drilled into the opposed ends of horizontal support element 26Y to facilitate permanently fastening the bearing support structure 24 to the apertures or slots 12S of the pit 12P.

The exemplary embodiments of a bearing support structure 24, as illustrated in FIGS. 2H and 2I, again employ a single cover/horizontal support assembly 26YC that fulfills the structural functions of the horizontal support assembly 26X and of cover plates 14C normally used in conventional dynamometer systems to cover the platform 18P openings around the roller 14 or roller segments 14S. The bearing support structure 24 may further include the single vertical support assembly 26X extending downward from adjacent the mid-point of cover/horizontal support assembly 26YC with the roller bearing 20 being secured to the lower end of the vertical support assembly 26. In the alternative, the bearing support structure 24 may include a pair of diagonal vertical support assemblies 26X extending diagonally downward from each opposed end of cover/horizontal support assembly 26YC toward the roller bearing 20, and in a further alternative and depending upon the mechanical strength required of the assembly, may include triangular gussets or reinforcements extending between the diagonal vertical support assemblies 26X and the cover/horizontal support assembly 26YC. To secure each bearing support structure 24 in position, one or more bore holes may be drilled into the opposed ends of the cover/horizontal support assembly 26YC to facilitate permanently fastening the bearing support structure 24 to the apertures or slots 12S of the pit 12P.

Figure 2J:
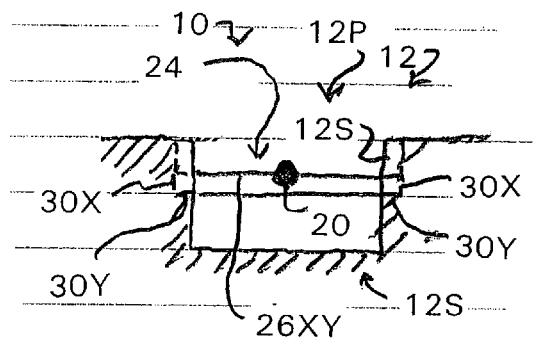

In a further exemplary embodiment, as illustrated in FIG. 2J, the horizontal and vertical support assemblies are combined into a single horizontally extending vertical/horizontal support element 26XY. Opposed ends of the vertical/horizontal support element 26XY engage with or are received by vertical slots 12S of the pit 12P with the ends of vertical/horizontal support element 26XY abutting against vertical surface 30X forming a back wall of the slot 12S and the lower side of the ends of vertical/horizontal support element 26XY resting on the horizontal surface 30Y forming the bottom surface of each slot 12S. In this case, therefore, each bearing support structure 24 is reduced to a single, combined element. To secure each bearing support structure 24 in position, one or more bore holes may be drilled into the opposed ends of the vertical/horizontal support element 26XY to facilitate permanently fastening the bearing support structure 24 to the slots 12S of the pit 12P.

Figure 2K:
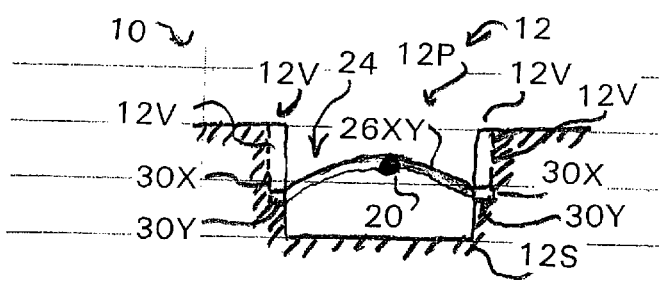
Figure 2L:
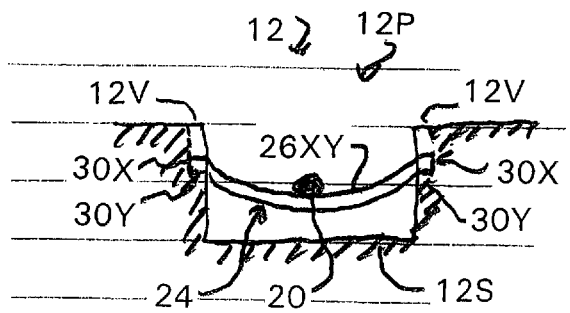

FIGS. 2K and 2L, in turn, illustrate an exemplary embodiment where the bearing support structure 24 again includes a single vertical/horizontal support element 26XY element that combines vertical support assembly and horizontal support assembly. In this embodiment, the vertical/horizontal support element 26XY is a single, curved beam supporting the bearing 20 at or adjacent its midpoint and with the ends of the beam abutting the vertical surfaces 30X forming the vertical walls of the pit 12P. In the embodiment illustrated in FIG. 2K, each end of vertical/horizontal support element 26XY includes the horizontal extension 26YH that engages the horizontal planes 30Y forming the top edge of the pit 12P and abuts against the vertical planes 30Y forming the walls of the pit 12P with vertical/horizontal support element 26XY forming a downward arch, so that vertical/horizontal support element 26XY thereby supports the bearing 20 against fore and aft and vertical forces and movement and fixes the horizontal and vertical locations of the bearing 20. To secure each bearing support structure 24 in position, one or more bore holes may be drilled into the opposed ends of the vertical/horizontal support element 26XY to facilitate permanently fastening the bearing support structure 24 to the slots 12S of the pit 12P.

In the embodiment illustrated in FIG. 2L, the vertical/horizontal support element 26XY is inverted, forming an upwardly arch, and because the ends of vertical/horizontal support element 26XY rest on the horizontal plane 30Y forming the bottom of the pit 12P and abut the vertical planes 30X forming the walls of the pit 12P, the bearing support structure 24 does not require horizontal extensions 26YH, further reducing the number of parts in the bearing support structure 24. As with the previous embodiment, one or more bore holes may be drilled into the opposed ends of the vertical/horizontal support element 26XY to facilitate permanently fastening the bearing support structure 24 to the slots 12S of the pit 12P.

In the embodiment illustrated in FIG. 2M, the horizontal and vertical support assemblies 26X and 26Y are combined into an X-shaped support assembly 26DX in which the roller bearing 20 is supported at the mid or crossing point of the two (or possibly four) diagonal arms 26DA of the X-shape, the ends of the two upper arms 26DA abut the vertical planes 30X forming the side walls of the pit 12P and the ends of the two lower arms 26DA abut a junction between the vertical planes 30X and the horizontal planes 30Y forming the side walls and the floor of the pit 12P. It will therefore be apparent that in this embodiment each of the diagonal arms 26DA of the X-shape function as both a horizontal support assembly 26X and a vertical support assembly 26Y. As with the previous embodiment, one or more bore holes may be drilled into the opposed ends of the diagonal arms 26DA to facilitate permanently fastening the bearing support structure 24 to the slots 12S of the pit 12P.

It will be noted with regard to any of the embodiments of the bearing support structures 24 that it may be necessary to provide restraints and supports to maintain the locations of roller bearings 20 along the axle 22 of the roller 14 to prevent or control movement of the roller bearings 20 and the roller 14 along the axis of the axle 22. As illustrated in FIG. 2A for the exemplary embodiment shown in FIG. 2J, axial movement of the bearing support structures 24, and thus of the roller bearings 20, may be prevented or controlled by axial support structures 32 extending between and connecting to the bearing support structures 24. As indicated, axial support structures 32 must be located outside of the radius of roller 14 and may typically be located, for example, along the side walls or floor of the pit 12P, and the adaptation of axial support structures 32 to other embodiments of bearing support structures 24 will be well understood by those of skill in the relevant arts.

Lastly, the above discussed exemplary embodiments of the roller assembly structures 10 and the bearing support structures 24 are particularly adapted for in-ground installations wherein, as discussed above, the structural features of the installation site 12 are employed in replacement for certain of the structural members of a roller assembly structure of the prior art. It will be recognized, however, that the roller assembly structures 10 and the bearing support structures 24, of the present invention, may be readily adapted for above-ground and even mobile installations with appropriate adjustments to the installation sites. For example, in the case of a mobile installation the trailer must normally include a frame assembly capable of supporting a vehicle and the dynamometer system, which will include some form of a pit-like frame structure to contain even a conventional roller assembly of the type customary in the prior art. It is, therefore, a relatively simple and inexpensive task to alter and/or adapt the trailer frame to include vertical surfaces 30X and horizontal surfaces 30Y corresponding generally to those discussed above with regard to the pit 12P of an in-ground installation. An above-ground installation will present a similar situation in that an above-ground installation, in which the vehicle is mounted on a platform rather than at floor level, will again require some form of framework to support the vehicle and that framework would, in any case, require a structure to support at least a conventional roller assembly such as known in the prior art. The additional structure required to adapt the above-ground installation from to a roller assembly of the present invention rather than a roller assembly of the prior art will, therefore, not be expensive or extensive.

As is apparent from the above discussion of the present invention, each of the two bearing support structures, in addition to supporting a roller bearing, also includes a horizontal surface and a vertical surface for matingly engaging with a corresponding horizontal and vertical of the opening or pit to facilitate positioning the roller at a desired height, relative to the opening or the pit, while also confining relative to and fro movement of the roller relative to the opening or the pit. That is, the horizontal and vertical surfaces of each bearing support structure securely supports the roller—and thus a driven wheel or wheels—at a desired fixed height, (2) securely supports the roller against horizontal motion along the axis of thrust of the driven wheel or wheels; and (3) supports the roller against torsional forces imposed by the driven wheel or wheels.

Since certain changes may be made in the above described dynamometer system without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A roller support assembly for a dynamometer system, the assembly consisting of:
   two bearing support structures, and each bearing support structure consists of a horizontal support assembly and a vertical support assembly permanently connected to and extending substantially normal from each opposed end of the horizontal support assembly;
   each horizontal support assembly supporting a roller bearing;
   opposed ends of each of the vertical support assemblies having a horizontal extension for engaging with a horizontal surface of a top edge of a pit and the vertical support assemblies engaging with vertical sides of the pit, and each horizontal extension having at least one bore hole therein to facilitate permanently fastening the bearing support structure to the pit.

* * * * *